Feb. 2, 1965 W. R. WILSON 3,168,681
PROTECTIVE ARRANGEMENT FOR AN ELECTRIC CIRCUIT BREAKER
Filed Sept. 4, 1962 3 Sheets-Sheet 1

INVENTOR:
WALTER R. WILSON,
BY William Freedman
ATTORNEY.

INVENTOR:
WALTER R. WILSON,
BY William Freedman
ATTORNEY.

Feb. 2, 1965 W. R. WILSON 3,168,681
PROTECTIVE ARRANGEMENT FOR AN ELECTRIC CIRCUIT BREAKER
Filed Sept. 4, 1962 3 Sheets-Sheet 3

INVENTOR:
WALTER R. WILSON,
BY William Freedman
ATTORNEY.

United States Patent Office 3,168,681
Patented Feb. 2, 1965

3,168,681
PROTECTIVE ARRANGEMENT FOR AN ELECTRIC CIRCUIT BREAKER
Walter R. Wilson, Wallingford, Pa., assignor to General Electric Company, a corporation of New York
Filed Sept. 4, 1962, Ser. No. 221,152
15 Claims. (Cl. 317—9)

This invention relates to a protective arrangement for an electric circuit breaker and, more particularly, to a protective arrangement that protects the circuit breaker against internal electrical breakdowns during the period immediately following the circuit-interrupting operation.

When an electric circuit breaker interrupts a high current, large volumes of hot gas are produced within the circuit breaker by the electric arc or arcs accompanying circuit interruption. In many types of circuit breakers, a relatively long period of time is required to remove or at least cool these gases. Until this removal or cooling occurs, the dielectric strength within the circuit breaker is very materially reduced from its normal or static value.

This reduced dielectric strength makes the circuit breaker susceptible to electric breakdowns during this period immediately following interruption; and it is most important that any such breakdown that does occur not result in the establishment of a power fault inside the circuit breaker.

Accordingly, an object of my invention is to protect an electric circuit breaker from the occurrence of an internally-located power fault during the reduced dielectric strength period immediately following circuit interruption.

Another object is to provide this protection without substantially increasing the likelihood of an evolved fault, i.e., a fault which develops during the switching of a relatively light current and results in an abrupt increase in current while the contacts of the circuit breaker are partially open.

Still another object is to provide the above-mentioned protection against internal faults without materially detracting from the chances that the circuit breaker has of restoring the power circuit to a normal condition by means of a rapid reclosing operation.

Still another object is to provide the above-mentioned protection against internal faults without substantially increasing the likelihood that a fault will occur on the power circuit during any protracted period when the breaker is maintained in open position after having recovered its internal dielectric strength.

In carrying out my invention in one form, I provide an electric circuit breaker that has a bus terminal and a line terminal. I also provide a gap device that is located externally of the circuit breaker and is electrically connected between the line terminal and ground. This gap device normally has a sparkover voltage at a first predetermined level that is greater than the peak value of switching surges typically encountered at the line terminal. The gap device includes control means for varying its sparkover voltage. This control means is operable to reduce the sparkover voltage of the gap device to a second predetermined level upon initiation of an opening operation of the circuit breaker. The second predetermined level is sufficiently low that voltage impulses reaching the line terminal that are high enough to spark over the gap device will be limited in voltage by the sparkover of the gap device to values which, in general, will be insufficient to cause an electrical breakdown internally of the circuit breaker between its line terminal and its bus terminal, even during the reduced dielectric strength period beginning about ½ cycle after circuit interruption.

For a better understanding of the present invention, reference may be had to the following description taken in conjunction with the accompanying drawings, wherein.

The present invention is applicable to circuit breakers that use either a liquid or a gas as an arc-extinguishing medium. By way of example, however, I have chosen to illustrate the invention applied to a conventional oil circuit breaker.

Figure 1:
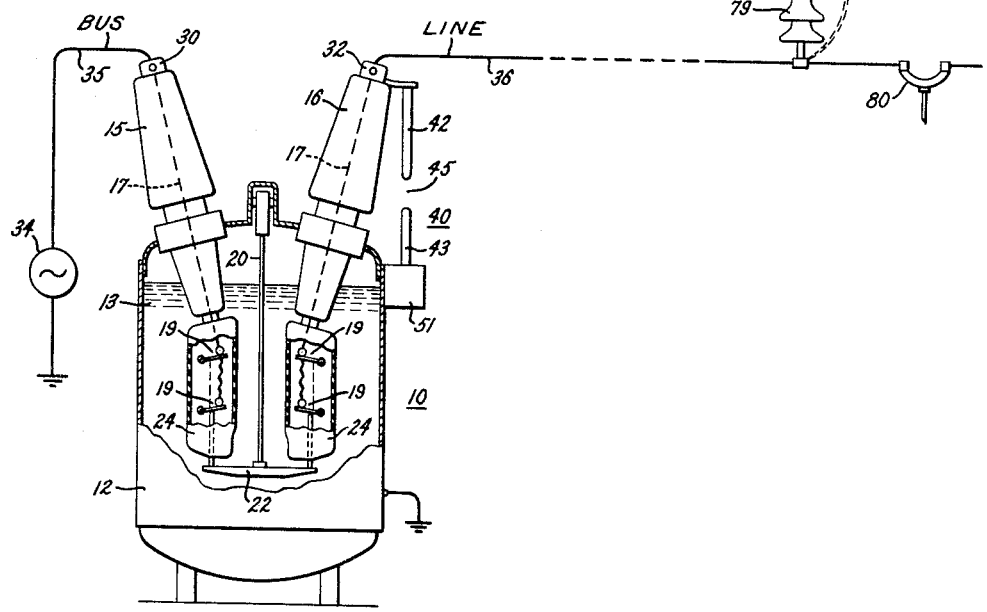
FIG. 1 is a schematic showing of an electric power system including one form of my invention.

Referring now to FIG. 1, this oil circuit breaker is generally designated 10. It comprises a metallic tank 12 filled with oil 13 in which the circuit is interrupted. Projecting through the top of the tank 12 into the circuit breaker oil is a set of high voltage terminal bushings 15 and 16. Each of these bushings comprises a high voltage conductor 17 extending therethrough and an insulating shell surrounding the conductor and insulating the conductor from the tank 12, which is at ground potential. Supported on the bushings at their lower end are the usual separable contacts of the circuit breaker. A plurality of pairs of these contacts are shown schematically at 19. These contacts are submerged within the oil 13.

The contacts 19 are controlled by means of a vertically-extending operating rod 20 of insulating material and a conductive cross-bar 22 that electrically interconnects the contacts. When the operating rod 20 is driven downwardly, the contacts 19 are separated to initiate a circuit interrupting operation. Series related arcs are drawn across the gaps between the contacts, and these arcs react with the surrounding oil to create pressures and flow conditions that result in rapid extinction of the arcs and interruption of the circuit. The desired control over these pressures and flow conditions is obtained by relying upon conventional arc-enclosing units, schematically illustrated at 24. One of these arc-enclosing structures 24 is provided for the contacts individual to each bushing.

After the circuit breaker has been opened, as described hereinabove, closing can be effected by driving the operating rod 20 upwardly to reengage the contacts 19. The power for this closing operation is obtained from a suitable closing device (not shown) connected to the operating rod 20.

The circuit breaker is connected in a power circuit in such a manner that the terminal 30 atop the bushing 15 is the bus terminal of the breaker and the terminal 32 atop the bushing 16 is the line terminal of the breaker. The power source for this circuit is shown at 34 connected between the bus 35 and ground.

If a fault should develop between the line 36 and ground, the circuit breaker should open to isolate the faulted line 36 from the source 34. A suitable relaying system (not shown) is customarily provided to initiate operation of the circuit breaker in response to development of such a fault. The high current arcs that result from such an opening operation react with the oil 13 to generate a large volume of hot gases inside the tank 12. Until these gases are cooled or are removed through suitable vents (not shown) provided at the top of the tank, the ielectric strength inside the tank is relatively low as compared to the dielectric strength under static conditions. This period of reduced dielectric strength will persist for several seconds following actual interruption, though with diminishing intensity, and it will therefore be apparent that the circuit breaker is vulnerable to internal electrical breakdowns for a substantial period following interruption. Generally speaking, it is most important to prevent the occurrence of any such internal breakdown that could be followed by power follow current. Such breakdowns are referred to hereinafter as "power faults." An example of such a power fault internal to the circuit breaker would be a breakdown across the open contacts 19 along a path extending electrically between the terminals of the circuit breaker. Such a breakdown would reestablish the electrical connection between the power source 34 and the fault and would permit power follow current of high magnitude to flow over this path. If such power follow current commenced within ½ cycle after interruption was completed, the circuit breaker would ordinarily still be in a condition to interrupt it. But if this power follow current commenced later than about ½ cycle after interruption has been completed, there would be a significant likelihood that the circuit breaker would not be able to interrupt it. Thus, it is most important to prevent such an internal power fault, especially during the portion of the reduced dielectric strength period beginning about ½ cycle after interruption is completed.

In the embodiment of FIG. 1, I insure against the occurrence of such an internal power fault by providing a special gap device 40 located externally of the circuit breaker 10. This gap device 40 is electrically connected between the line terminal 32 and the grounded tank 12 of the circuit breaker. The gap device comprises two rod-type electrodes 42 and 43, the upper one of which 42 is stationarily mounted on the line terminal 32 of the circuit breaker. The lower electrode 43 is electrically connected to the grounded tank 12 by a suitable flexible connector 44 and is vertically movable, as will soon be described, to provide a gap 45 of variable length between the two electrodes 42 and 43.

When the circuit breaker 10 is in its closed position the gap 45 is at its maximum length. If the gap 45 is being relied upon to protect the circuit breaker or other circuit components from overvoltages while the breaker is closed, then the gap at its maximum length should be set to spark over at an impulse voltage below the basic impulse insulation level of the circuit breaker or other protected components. But preferably suitable lightning arresters (not shown) are relied upon for protecting the circuit components while the circuit breaker is closed. In such cases, the maximum sparkover voltage of the gap is not crucial. The minimum sparkover voltage of the gap when at its maximum length is, however, important. This minimum sparkover voltage should exceed the crest value of any switching surges normally imposed upon the line so that the gap 45 is not sparked over by these switching surges. Typically, the gap sparkover voltage would be above three times normal line-to-ground voltage to provide a reasonable assurance against breakdown by the voltages accompanying restrikes on capacitance switching operations, these restrikes typically being the most severe switching surges encountered. In some circuit applications, e.g., where the switching surges are consistently of a lower amplitude, the sparkover voltage may be adjusted to an appropriately lower value.

Figure 2:
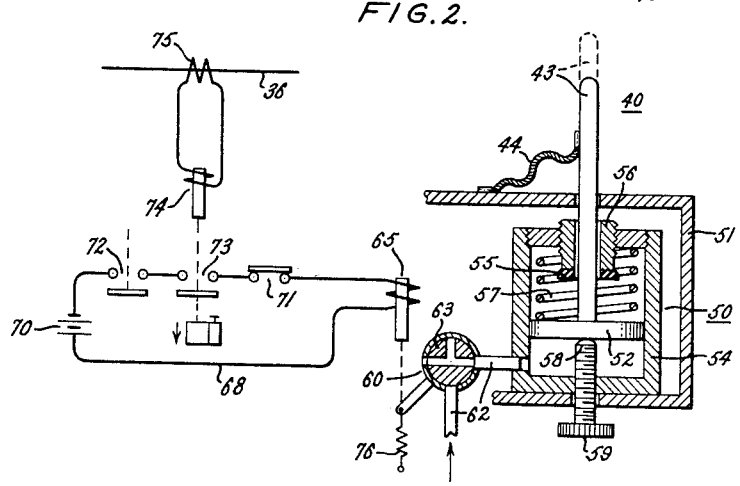
FIG. 2 is a schematic showing of a portion of the apparatus depicted in FIG. 1.

When the circuit breaker 12 opens, the rod electrode 43 is quickly driven upwardly to shorten the gap 45 between the electrodes 42 and 43 and reduce the impulse sparkover voltage of the gap. When the electrode 43 reaches its uppermost position, the impulse sparkover voltage across the gap 45 will, in general, be lower than the minimum impulse sparkover voltage across the open contacts of the circuit breaker, even during the portion of the reduced dielectric strength period beginning about ½ cycle after circuit interruption. More specifically, when the electrode 43 reaches its uppermost position, the impulse sparkover voltage across gap 45 is so low relative to the minimum sparkover voltage across the open contacts of the circuit breaker that, in general, the minimum value of voltage that will cause breakdown of the gap 45 is insufficient to cause a breakdown across the contacts of the circuit breaker. This relationship exists even during the portion of the reduced dielectric strength period beginning about ½ cycle after the interruption of maximum rated currents, which are the currents that produce the greatest reduction in dielectric strength inside the tank 12. Thus, if a breakdown does occur from the line side of the circuit breaker even during this interval, it will generally occur across the gap 45 to ground rather than through the fluid in the circuit breaker to the bus side of the circuit breaker. For driving the rod electrode 43 upwardly into its position of minimum gap length, a suitable fluid motor 50 illustrated in FIG. 2 is provided. This fluid motor 50 comprises a cylinder 54 which is stationarily mounted within a metallic housing 51 attached to the side of the tank 12 of the circuit breaker. Slidably mounted within the cylinder 54 is a piston 52 rigidly connected to the lower electrode 43 and reciprocably movable within the cylinder in a vertical direction. When pressurized air is supplied to the space beneath the piston 52, the piston is driven upwardly until it engages a suitable buffer 55 mounted on an adjustable stop 56. When this engagement occurs, the rod electrode 43 has reached its uppermost position, and the gap 45 has its minimum length.

For returning the piston 52 to its initial position, the pressurized air is vented from the space beneath the piston 52 to permit a reset spring 57 to drive the piston downwardly to its initial position. A suitable buffer 58 atop an adjustable stop 59 terminates downward motion of the piston 52 when it reaches this initial position. The electrode 43 is then at its lowermost position and the gap 45 has its maximum length.

For controlling the fluid motor in such a manner that the electrode 43 moves into its uppermost position when the circuit breaker is opened, a suitable valve 60 is connected in the supply line 62 leading to the cylinder 54 from a suitable pressure source (not shown). When the rotatable control member 63 of the valve 60 is in its position of FIG. 1, the space beneath the piston 52 is vented to atmosphere. But when the control member 63 is rotated 90 degrees clockwise, the source of fluid pressure is connected to the space beneath the piston 52, and the piston is driven upwardly in the manner described hereinabove. When the rotatable control member 63 is returned to its position of FIG. 2, the air beneath the piston 52 is vented to atmosphere, and the spring 57 responds by restoring the piston 52 to its position of FIG. 2.

The movable valve member 63 is controlled by a solenoid 65 connected in a control circuit 68. This control circuit includes a source of electrical energy, such as a battery 70, and three switches 71, 72, and 73 connected in series with the battery and the solenoid. The switch 72 is an ordinary "b" switch sensitive to the position of the circuit breaker and is caused by conventional means (not shown) to close when the circuit breaker opens and to open when the circuit breaker closes. The switch 73 is constituted by the normally-open contacts of a relay 74 that is arranged to pick up in response to fault currents in the power line 36. This relay 74 drops out with a time delay a predetermined length of time after fault current ceases to flow in power line 36. When a fault current flows through power line 36, relay 74 closes its contacts 73 and "b" switch 72 closes in response to initial opening movement of the circuit breaker. When both of these switches 72 and 73 are closed, the control circuit 68 is completed, causing the solenoid 65 to actuate the valve member 63 into its open position, thus producing an upward stroke of piston 52. It will therefore be apparent that upon opening of the circuit breaker, the fluid motor drives the electrode 43 into its uppermost position of minimum gap length. The electrode 43 will have reached its uppermost position by the time the circuit breaker has completed the interrupting operation.

If the circuit breaker is immediately reclosed or if it remains open for a period longer than the dropout period of the relay 74, then electrode 43 is returned to its lowermost position of maximum gap length. In the case of an immediate, or automatic, reclosure, the desired return movement of electrode 43 is initiated by opening of automatic-reclosure-sensitive switch 71. This switch 71 is arranged in a suitable manner (not shown) to open as soon as the circuit breaker reaches a position near its open position following reception of a reclosing impulse. Opening of the switch 71 interrupts control circuit 68, de-energizing solenoid 65 and permitting a reset spring 76 to return the valve 60 to its position of FIG. 2. This vents the space beneath piston 52 and permits piston reset spring 57 to reset the piston 52 to its position of FIG. 2. Thus, if the circuit breaker remains open for only a short time, the gap is restored to its maximum length as soon as the circuit breaker recloses. The reset speed of the movable electrode 43 is so controlled that gap 45 attains its maximum length at substantially the same time as the contacts reach closed position.

If the circuit breaker is not immediately reclosed, the relay 74 will drop out after a time period made long enough to allow the circuit breaker to recover most of its dielectric strength inside the tank. When dropout of relay 74 occurs, its contacts 73 open to interrupt the control circuit 68 and permit return of the electrode 43 to its lowermost position of maximum gap length.

A type of fault situation that can be most difficult for the conventional circuit breaker to handle is one in which the power line 36 is subjected to a series of lightning strokes occurring in close succession. This condition will first be described in connection with a circuit breaker such as 10 of FIG. 1 with gap device 40 assumed to be omitted. When the first of the lightning strokes occurs, it flashes over an insulating support 79 at some point on the line 36 as indicated at F in FIG. 1. An impulse wave travels from this point through the closed circuit breaker to the bus where a suitable lightning arrester (not shown) limits the voltage. Immediately thereafter, the relays (not shown) sense the fault and open the circuit breaker to interrupt the circuit. This creates the previously-described gas bubbles within the oil 13 of the tank 12. While these bubbles of hot gas are still present in the oil 13, a second lightning stroke to the line 36 is assumed to occur, again causing a flashover at F. The line is open-ended at this time since the breaker 12 is open. Accordingly, the traveling wave resulting from the second lightning stroke tends to double by reflection when the open breaker is encountered. This subjects the dielectrically-weakened oil in the tank 12 to a voltage that might conceivably be as high as twice the withstand voltage of the line insulation, or more than twice the basic impulse insulation level of the crcuit breaker 10.

This high impulse voltage will produce a breakdown through the oil of the circuit breaker. If the breakdown is from the line side of the breaker to ground, then there is a harmless low energy discharge generally with no power follow current. Power current does not follow because the lightning stroke has shorted line 36 to ground at F and any current flowing through the line 36 from its remote end is diverted through the ionized path of the flashover at F. In addition, there will typically be a remote circuit breaker such as shown at 80 that will open to interrupt the flow of any such power current from the remote end of the line 36, and this also precludes the flow of power follow current from the remote end of the line through the previously-described breakdown path inside the tank 12. Additional lightning strokes would simply duplicate this condition, still without producing power follow current. It will therefore be apparent that there is little likelihood that a breakdown from the line terminal to the tank under these conditions would cause any serious difficulty.

However, if this breakdown caused by the second lightning stroke were from the line terminal of the breaker to the source terminal through the circuit breaker oil, an entirely different situation would be present. Power follow current could flow through this breakdown path from the source 34 to the flashover path at F. Since the breaker 10 would then be open, there would be a significant likelihood that the breaker could not interrupt this current and a serious failure would result.

The gap device 40 reduces the probability of such a failure by providing externally to the circuit breaker 12 on its line side a breakdown path which will generally spark over before a breakdown can occur across the contacts of the circuit breaker 10 through its oil 13. In this connection, the gap 45 is then at its minimum length since it had moved into this position immediately upon opening of the circuit breaker. The second lightning stroke thus sparks over this external path instead of any path across the contacts. Since this external path is at the line side of the circuit breaker, there is a reasonable assurance that no power follow current will follow the sparkover produced by the second stroke, as was explained above. Thus, the breaker and the connected system are protected from damage during this second stroke of a multiple lightning stroke condition. Similar protection is provided by the gap device 40 during any subsequent strokes that closely follow the second stroke. Since there is no power follow current under the above-described conditions, the gap 45 can easily recover its dielectric strength after the sparkover.

Another type of fault condition that can be troublesome for a circuit breaker is the so-called "evolved fault." In this type of situation, the fault develops while the breaker is opening and the current suddenly increases to a very high value after the contacts have been at least partially separated. This type of fault could develop as a result of a voltage surge occurring during a light current switching operation and causing a breakdown of insulation between the line and ground. For example a restrike occurring during a line dropping operation might produce a voltage surge of sufficient magnitude to produce an insulation flashover. This breakdown or flashover would be followed by power follow current flowing through the circuit breaker, beginning at an instant after the contacts have been partially opened. Under these conditions, high current arcs of appreciable length would suddenly be developed across the contacts without the gradual arc lengthening that usually accompanies interruption. This abrupt establishment of long high current arcs would generate exceptionally high values of pressure since there would still be considerable liquid within the arc-enclosing unit 24. In extreme cases, such pressures could burst the arc-enclosing unit 24 or cause other damage.

It is important that no such evolved faults be caused by the presence of gap device 40. There would, of course, be a tendency in this direction if the gap length was at its minimum value during the voltage surges accompanying the interruption of light currents. To insure against breakdown of the gap 45 by such voltage surges, I maintain the gap at its maximum length during light current interruptions. In this condition, the gap has a dielectric strength above that of any switching overvoltages normally encountered, as pointed out hereinabove. There is thus no significant likelihood that the gap 45 will be responsible for the development of any evolved faults.

The gap device 40 is prevented from reducing the length of gap 45 during light current switching by means of the overcurrent sensitive relay 74. This relay 74 picks up only in response to fault currents in power line 36, and until it does pick up, its contacts 73 remain open and prevent operation of the fluid motor 50 to shorten the gap. Thus, during light current switching, the relay 74 remains dropped out, preventing the gap 45 from being shortened.

For imparting to the relay 74 the desired sensitivity to overcurrents in power line 36, a suitable current transformer 75 is provided for supplying to the relay 74 a current indicative of line current.

After light current interruptions, there is little or no need for a shortened gap 45 at the line side of the circuit breaker inasmuch as light currents generate only small amounts of gases and thus do not materially impair the dielectric strength of the oil inside tank 12. In other words, after these light current interruptions, the oil has enough dielectric strength to insure against any breakdowns across the contacts as a result of closely succeeding voltage impulses. Thus, maintaining the gap at its maximum length during this interval produces no significant disadvantages in this regard.

If the circuit breaker 10 opens after a heavy current interruption and then remains open, there is no need for the gap 45 to continue remaining shortened. In this regard, the oil 13 in the circuit breaker recovers most of its dielectric strength several seconds after the interrupting operations, and thereafter there is no significant likelihood of a breakdown across its contacts from voltage surges on the line 36. Hence, the reduced dielectric strength provided by the gap device 40 then becomes unnecessary, and, as a matter of fact, undesirable because of the increased likelihood of a breakdown resulting therefrom.

In the illustrated arrangement of FIG. 2, I assure restoration of the gap 45 to its normal length immediately after the breaker oil recovers its dielectric strength by reliance upon the time delay drop-out characteristics of the relay 74. When the circuit breaker 10 opens, the relay 74 is deenergized as a result of the interruption of current flow through the line 36 and remains deenergized so long as the circuit breaker remains open. The relay 74 does not drop out immediately, however, but only after a time delay made long enough to give the oil in the circuit breaker tank an opportunity to recover its high level of dielectric strength. Upon expiration of this period, the relay 74 drops out, opening its contacts 73 and permitting restoration of the gap 45 to its normal length, in the manner hereinabove described.

If the circuit breaker 10 recloses immediately after opening, it is important that the gap 45 be restored to its normal length as soon as possible thereafter in order to prevent the possibility of an unnecessary flashover of the gap, as by a transient voltage produced by closing of the circuit breaker. This quick reset type of performance for the gap is obtained by reliance on the reclosure-sensitive switch 71. If the circuit breaker receives an automatic-reclosing signal, the switch 71 will open when the circuit breaker reaches a position near its open position. Opening of switch 71 interrupts control circuit 68, thus causing the valve 60 to vent the space beneath the piston 52, allowing spring 57 to restore the gap 45 to its normal length. The speed of the piston 52 is so controlled that the gap 45 attains its maximum length at substantially the same time as the contacts of the circuit breaker reengage. Preferably, maximum gap length is attained just ahead of the contact reengagement point. As the circuit breaker reaches closed position, the switch 71 closes, but the "b" switch 72 opens slightly ahead of this point, thus maintaining the gap at its maximum length if the breaker remains closed. If the circuit breaker should trip open immediately after this reclosing operation, the "b" switch 72 would immediately close in response to such tripping to again reduce the gap length of the gap 45.

Figure 3:
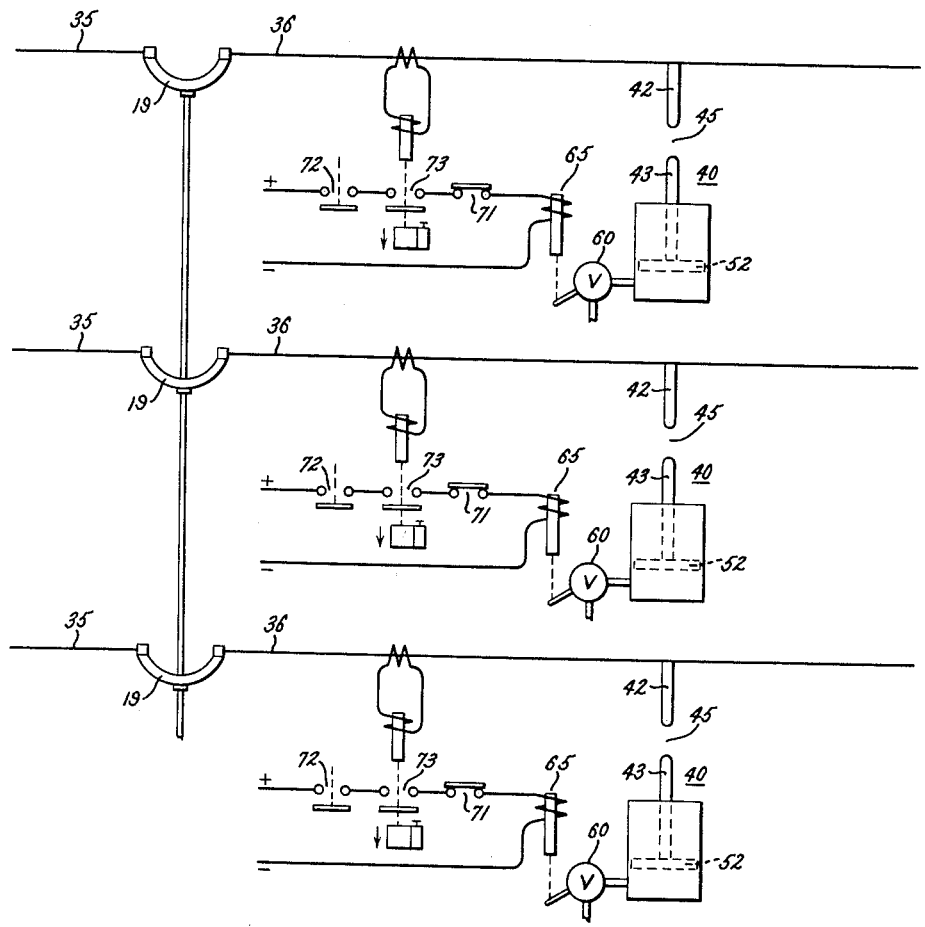
FIG. 3 is a schematic showing of one form of my invention applied to a three phase circuit breaker.

When the present invention is applied to a three-phase circuit breaker, three gap devices 40 are preferably provided, one individual to each of the phases or pole units, as is schematically illustrated in FIG. 3. When a single phase fault to ground occurs, all three phases of the circuit breaker open in unison, but the gap device on only the faulted phase responds to the fault and shortens its gap 45. This follows from the fact that in only the faulted phase does the relay 74 pick up to permit operation of the associated gap device 40.

Confining operation of the gap devices to only the phase involved in the fault is desirable for several reasons. First of all, it is important that no evolved fault take place on the unfaulted lines due to restrikes or similar switching surges. By maintaining the gap on unfaulted phases at maximum length during this interval, the gap can withstand the surges and there is thus no significant likelihood that it will be sparked over by the surges to initiate an evolved fault. The second reason for confining operation of the gap devices to only the faulted phase is that the protection afforded by the gap devices is needed on only the phase that interrupts fault current. The other phases or pole units are customarily in separate tanks and do not interrupt fault current during such a single phase fault condition. Accordingly, little gas is generated in the tanks of these other pole units and there is no substantial impairment of dielectric strength to invite a breakdown across the contacts of these pole units.

Figure 4:
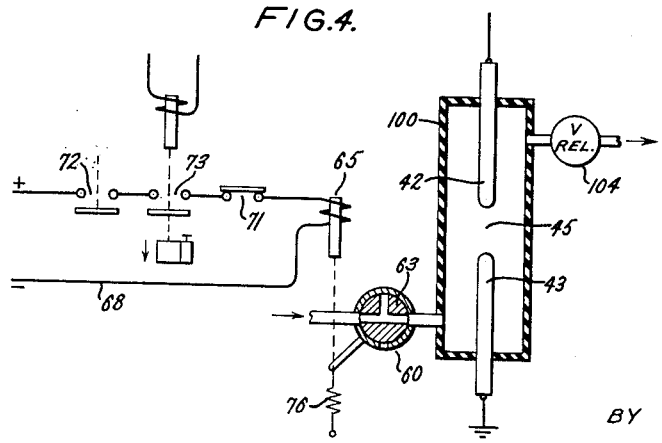
FIG. 4 illustrates another embodiment of the invention.

Although the arrangement depicted in FIGS. 1–3 is a preferred one, it is to be understood that numerous variations are possible without departing from the broader apsects of my invention. For example, instead of relying upon variations in the gap length for changing the breakdown voltage of the gap, I can rely upon pressure variations for accomplishing this same result. FIG. 4 illustrates an embodiment of the invention that relies upon such pressure variations. Here the gap 45 between the electrodes 42 and 43 is enclosed by a housing 100 made of suitable insulating material. Normally the space within this housing 100 communicates with a source of pressure (not shown) through the valve 60. The source of pressure is maintained at a generally constant predetermined pressure by suitable regulating means (not shown). As a result, the pressure inside housing 100 is normally at a generally constant predetermined level. This pressure level is sufficiently high and the gap is sufficient long that the sparkover voltage between the electrodes 42 and 43 is at the desired high level corresponding to that present with maximum gap length in FIG. 1. When the circuit breaker 10 opens to interrupt a fault current, the switches 72 and 73 close in the same manner as described in connection with FIG. 2. This completes the control circuit 68 causing the solenoid 65 to operate the movable valve number 63 to a position that vents air from the housing 100 either directly to the atmosphere or through a pressure control valve (not shown) and reduces the pressure therein. This pressure reduction reduces the impulse sparkover voltage of the gap 45 to the same level as is present in FIGS. 1 and 2 when the gap is at minimum length. Thus, during this reduced pressure period, the gap 45 is more susceptible to breakdown than is any path across the contacts of the protected circuit breaker.

If the protected circuit breaker 10 is automatically reclosed, the reclosure-sensitive switch 71 opens to interrupt the control circuit 68, thereby permitting the valve members 63 to return to its position of FIG. 4 to reestablish normal high dielectric strength across the gap 45 as the circuit breaker contacts reach closed position. If the circuit breaker 10 had remained open for a period of time greater than the time delay drop-out time of relay 74, the contacts 73 of this relay would open to interrupt circuit 68 and cause the restoration of normal high dielectric strength across gap 45.

Should the gap 45 spark over during the period of reduced dielectric strength, there would generally be no power follow current to generate significant arced gases or pressure. If moderate power follow current were to appear, gases generated by the arc will be vented from the chamber 100 to atmosphere through the valve 60, which is then in its vented position. If for some reason, the volume of these gases generated should be exceptionally high, then a pressure relief valve 104 will open to assist in venting these gases. This pressure relief valve is of a suitable construction that opens in response to pressures above a predetermined level. The opening pressure for this valve is higher than the normal pressure within housing 100.

Figure 5:
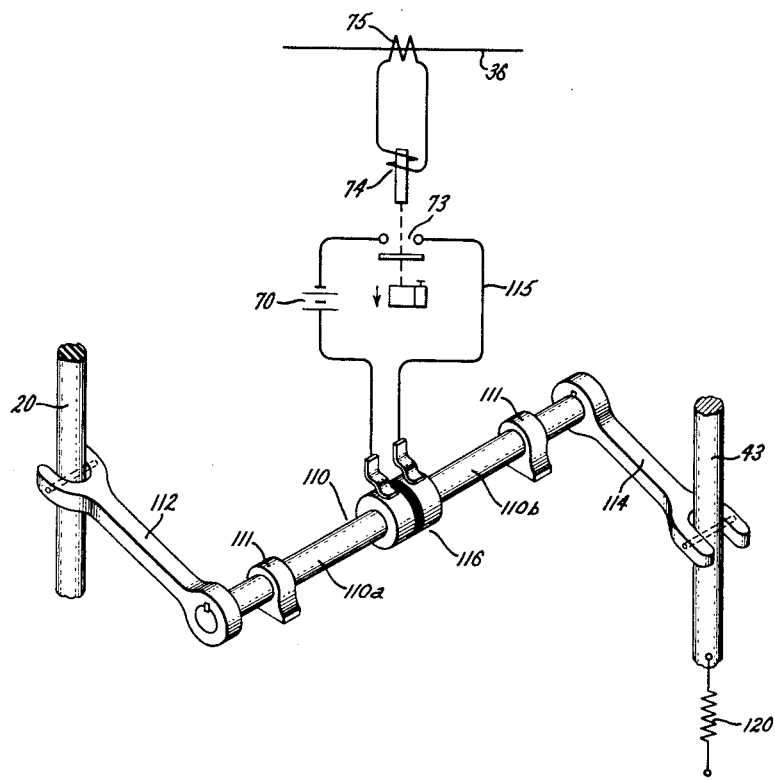
FIG. 5 is a schematic illustration of still another embodiment of the invention.

As another alternative to the arrangement of FIGS. 1–3, the movable electrode 43 can be mechanically coupled to the movable contact operating rod 20 of the circuit breaker in such a manner that it is driven upwardly into its position of minimum gap length when the breaker is open. For example, FIG. 5 shows a rotatable element 110 having cranks 112 and 114 keyed to its opposite ends. The rotatable element 110 is journaled in suitable bearings 111 for rotation about its longitudinal axis. Crank 112 is suitably coupled to the operating rod 20 and crank 114 is suitably coupled to the movable electrode 43. The rotatable element 110 is divided into two parts, 110a and 110b, connected together by a suitable magnetic clutch. When the circuit 115 across the clutch is open, the parts 110a and 110b are uncoupled, and when the circuit 115 is closed, the parts 110a and 110b are coupled together. When the relay 74 picks up in response to an overcurrent in power line 36, the clutch couples the two parts 110a and 110b together and permits opening movement of the contact operating rod 20 to drive the electrode 43 into its uppermost position of minimum gap length. If the breaker remains open, the relay 74 drops out after a predetermined time delay, permitting a reset spring 120 to return the electrode 43 to its position of maximum gap length. If the circuit breaker is immediately reclosed after an opening operation, the relay 74 would not have had time to drop out and the coupling would still be operative, so that closing motion of the operating rod 20 would restore the electrode 43 to its position of maximum gap length.

Although I have shown the gap device as comprising only a single gap that is subjected to the entire line-to-ground voltage, it should be apparent that it can alternatively comprise a plurality of series-related gaps, with one or more of these gaps being provided with means such as shown in FIGS. 2 or 4 for varying its sparkover voltage.

As a further refinement, I intend to comprehend within the scope of my invention gap arrangements that include one or more resistors, preferably non-linear, in series with the gap or gaps to limit the amount of current that flows through the gap or gaps in the event that the spark over results in power follow current. Non-linear resistors suitable for this application are those typically employed in the lightning arrestor art for valve-type lightning arrestors.

It will be obvious to those skilled in the art that various other changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. In combination with an electric circuit breaker having a bus terminal and a line terminal,
    (a) a gap device located externally of said circuit breaker and electrically connected between said line terminal and ground,
    (b) said gap device normally having a sparkover voltage at a first predetermined level that is greater than the peak value of switching surges typically encountered at said line terminal,
    (c) control means for varying the sparkover voltage of said gap device and operable to reduce the sparkover voltage of said gap device to a second predetermined level upon initiation of an opening operation of said circuit breaker,
    (d) said second predetermined level being sufficiently low that when the circuit breaker is open any impulse voltages reaching said line terminal that are high enough to spark over said gap device will be limited in voltage by such sparkover to values which, in general, will be insufficient to cause an electric breakdown internally of said circuit breaker between said line terminal and said bus terminal, even during the portion of the reduced dielectric strength period beginning about ½ cycle after the interruption of currents near the maximum rating of said circuit breaker.

2. The combination of claim 1 in which said gap device comprises a pair of relatively movable electrodes defining a gap therebetween and said control means comprises means for moving one of said electrodes to reduce the length of said gap upon initiation of an opening operation.

3. The combination of claim 1 in which:
    (a) said gap device comprises a pair of relatively movable electrodes and a housing about said electrodes adapted to contain a pressurized gas for maintaining the sparkover voltage of said gap device at said first predetermined level, and
    (b) said control means comprises means for reducing the pressure of the gas in said housing upon initiation of a circuit breaker opening operation.

4. The combination of claim 1 in combination with means for preventing said control means from operating to reduce the sparkover voltage of said gap device in the event that said circuit breaker is opened to interrupt a low value of current in comparison to its maximum rated interrupting current.

5. The combination of claim 1 in combination with means for restoring the gap to its normal condition upon initiation of a circuit breaker reclosing operation.

6. The combination of claim 1 in combination with means for preventing said control means from operating to reduce said sparkover voltage in the event that said circuit breaker is opened to interrupt a low value of current in comparison to its maximum rated interrupting current, and means operative after said sparkover voltage has been reduced to restore the gap to its normal sparkover voltage upon initiation of a circuit breaker reclosing operation.

7. The combination of claim 1 in combination with means for restoring the gap to its normal condition after the circuit breaker remains open a predetermined time.

8. The combination of claim 1 in combination with means for restoring the gap to its normal condition after the circuit breaker remains open a predetermined time, and means for restoring the gap to its normal condition upon initiation of a reclosing operation prior to expiration of said predetermined period.

9. The combination of claim 1 in combination with means for preventing said control means from operating to reduce said sparkover voltage in the event that said circuit breaker is opened to interrupt a low value of current in comparison to its maximum rated interrupting current, and means operative after said sparkover voltage has been reduced to restore the gap to its normal sparkover voltage upon initiation of a circuit breaker reclosing operation, and means for restoring the gap to its normal condition after the circuit breaker remains open a predetermined time in the event that no automatic reclosing is effected.

10. The combination of claim 1 in which said gap device comprises a pair of relatively movable electrodes defining a gap therebetween and said control means comprises motor means that operates to reduce the length of said gap upon initiation of a circuit breaker opening operation.

11. The combination of claim 1 in which said gap device comprises a pair of relatively movable electrodes defining a gap therebetween and said control means comprises a mechanical connection for transmitting force between an operating part of said circuit breaker and one of said electrodes.

12. The combination of claim 1 in which gap device comprises a pair of relatively movable electrodes defining a gap therebetween and said control means comprises:
(a) motor means that operates to reduce the length of said gap upon initiation of a circuit-breaker opening operation,
(b) an electric circuit for initiating operation of said motor means upon initiation of a circuit-breaker opening operation,
(c) and means connected in said electric circuit sensitive to overcurrents through said circuit breaker for rendering said electric circuit inoperative to initiate operation of said motor means when said circuit breaker is opened to interrupt a low value of current in comparision to its rated maximum interrupting current.

13. The circuit breaker of claim 1 in which said gap device comprises a pair of relatively movable electrodes defining a gap therebetween and said control means comprises:
(a) a mechanical connection for transmitting force between an operating part of said circuit breaker and one of said electrodes,
(b) a clutch in said mechanical connection for coupling and uncoupling said electrode from said operating part, and
(c) means for causing said clutch to uncouple said electrode and said operating part from each other when said circuit breaker is opened to interrupt a low value of current in comparison to its rated maximum interrupting current.

14. In combination,
(a) a polyphase electric circuit breaker comprising a plurality of separate pole units each having a bus terminal and a line terminal for connection in the respective phases of a polyphase alternating current power system,
(b) means for opening said pole units substantially in unison and for closing said pole units substantially in unison,
(c) a plurality of gap devices one for each of the pole units,
(d) each gap device being located externally of its corresponding pole unit and electrically connected between the line terminal of said pole unit and ground,
(e) each of said gap devices normally having a sparkover voltage at a first predetermined level that is greater than the peak value of switching surges typically encountered at said line terminal,
(f) control means individual to each of said pole units for varying the sparkover voltage of the gap device associated with that particular pole unit and operable to reduce the sparkover voltage of said gap device to a second predetermined level upon initiation of an opening operation of said pole unit,
(g) said predetermined level being sufficiently low that when said circuit breaker is open, said gap device is generally more susceptible to sparkover by voltage impulses reaching said line terminal than is any path located internally of said pole unit between its line terminal and bus terminal, even during the portion of the reduced dielectric strength period beginning ½ cycle after the interruption of currents near maximum interrupting rating,
(h) and means for preventing the control means of any pole unit from operating to reduce the sparkover voltage of its particular gap device when said pole unit is opened to interrupt a low value of current flowing therethrough in comparision to its maximum rated current, 15. In combination with an electric circuit breaker having a bus terminal and a line terminal,
(a) a gap device located externally of said circuit breaker and electrically connected between said line terminal and ground,
(b) said gap device normally having a sparkover voltage at a first predetermined level that is greater than the peak value of switching surges typically encountered at said line terminal,
(c) control means for varying the sparkover voltage of said gap device and operable to reduce the sparkover voltage of said gap device to a second predetermined level upon initiation of an opening operation of said circuit breaker,
(d) said second predetermined level being sufficiently low that when said circuit breaker is open, said gap device is generally more susceptible to sparkover by voltages reaching said line terminal than is any path located internally of said circuit breaker between said line terminal and said bus terminal, even during the reduced dielectric strength period following interruption of high currents.

References Cited in the file of this patent
UNITED STATES PATENTS
2,553,291  Barr ------------------ May 15, 1951
FOREIGN PATENTS
599,119  Germany -------------- June 25, 1934